(12) United States Patent
Minabe et al.

(10) Patent No.: US 8,466,949 B2
(45) Date of Patent: Jun. 18, 2013

(54) EXPOSURE DEVICE AND IMAGE FORMING APPARATUS

(75) Inventors: Jiro Minabe, Kanagawa (JP); Katsunori Kawano, Kanagawa (JP); Kazuhiro Hayashi, Kanagawa (JP); Yasuhiro Ogasawara, Kanagawa (JP); Shin Yasuda, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 675 days.

(21) Appl. No.: 12/614,799

(22) Filed: Nov. 9, 2009

(65) Prior Publication Data

US 2010/0259592 A1 Oct. 14, 2010

(30) Foreign Application Priority Data

Apr. 9, 2009 (JP) .................. 2009-095326

(51) Int. Cl.
- *B41J 27/00* (2006.01)
- *B41J 15/14* (2006.01)
- *B41J 2/385* (2006.01)
- *G03G 13/04* (2006.01)
- *G02B 5/32* (2006.01)
- *G02B 26/10* (2006.01)

(52) U.S. Cl.
USPC .............. 347/256; 347/134; 347/241; 359/17

(58) Field of Classification Search
USPC .................. 347/134, 241, 256; 359/15, 17, 19
See application file for complete search history.

(56) References Cited

U.S. PATENT DOCUMENTS

| | | | | |
|---|---|---|---|---|
| 4,580,151 A | * | 4/1986 | Bamba | 347/135 |
| 6,643,300 B1 | * | 11/2003 | Ori | 372/23 |
| 7,885,164 B2 | * | 2/2011 | Horimai | 369/103 |
| 8,081,360 B2 | * | 12/2011 | Yasuda et al. | 359/15 |

FOREIGN PATENT DOCUMENTS

| | | |
|---|---|---|
| JP | A-4-201270 | 7/1992 |
| JP | A-2000-330058 | 11/2000 |
| JP | A-2007-237576 | 9/2007 |

* cited by examiner

*Primary Examiner* — Uyen Chau N Le
*Assistant Examiner* — John M Bedtelyon
(74) *Attorney, Agent, or Firm* — Oliff & Berridge, PLC

(57) ABSTRACT

There is provided an exposure device including: a light-emitting element array having an elongated support and plural light-emitting elements, the light-emitting elements being arranged in at least one row along a length direction of the support such that a spacing between two adjacent light-emitting elements is a pre-specified first spacing; and a hologram element array having a hologram recording layer disposed on the support and plural hologram elements formed, the plural hologram elements corresponding with each of the light-emitting elements and being formed such that a spacing along the support length direction between two adjacent hologram elements is the first spacing, and a diameter in the support length direction of each of the plural hologram elements being larger than the first spacing, such that a respective light emitted from each of the light-emitting elements is diffracted and focused toward a pre-specified image-forming plane by the corresponding hologram element.

12 Claims, 15 Drawing Sheets

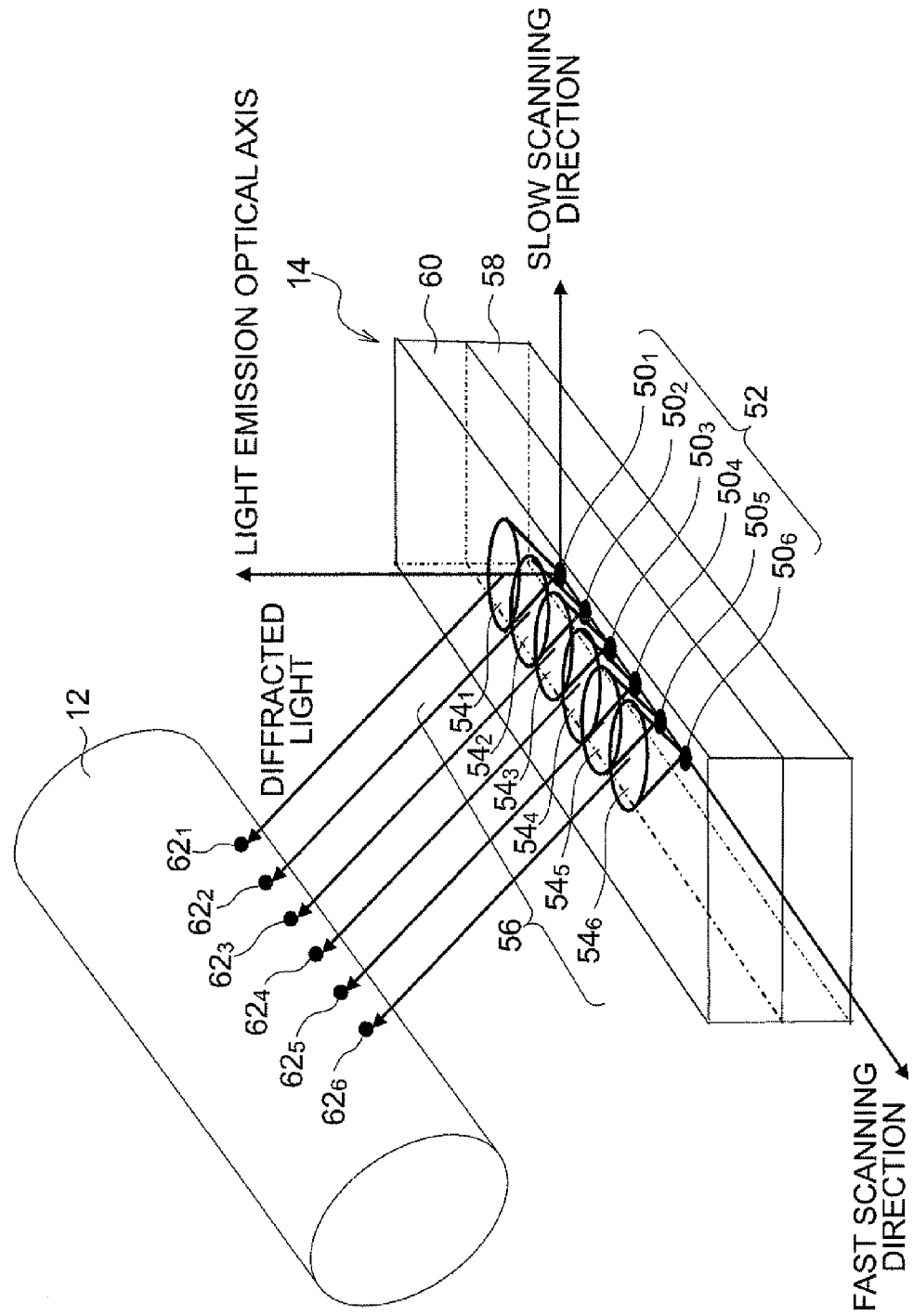

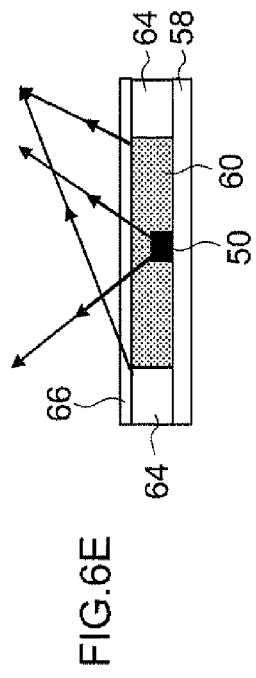
FIG.6D
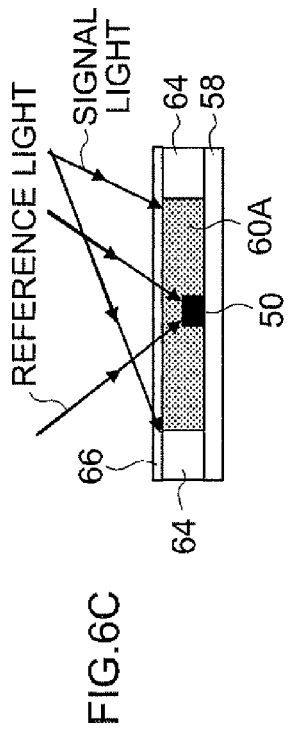
FIG.6E
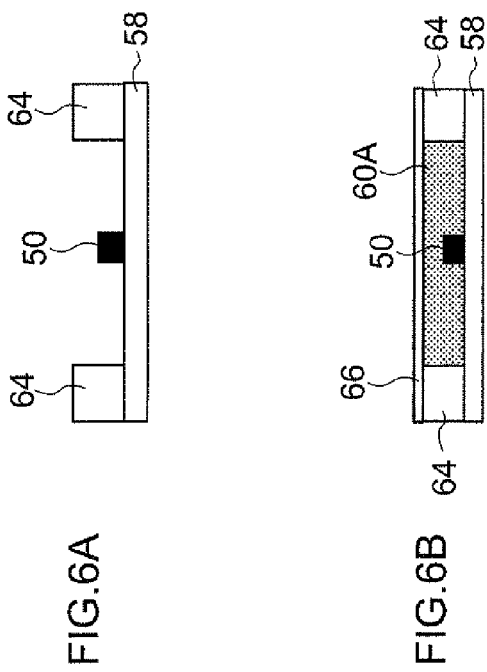
FIG.6A
FIG.6B
FIG.6C

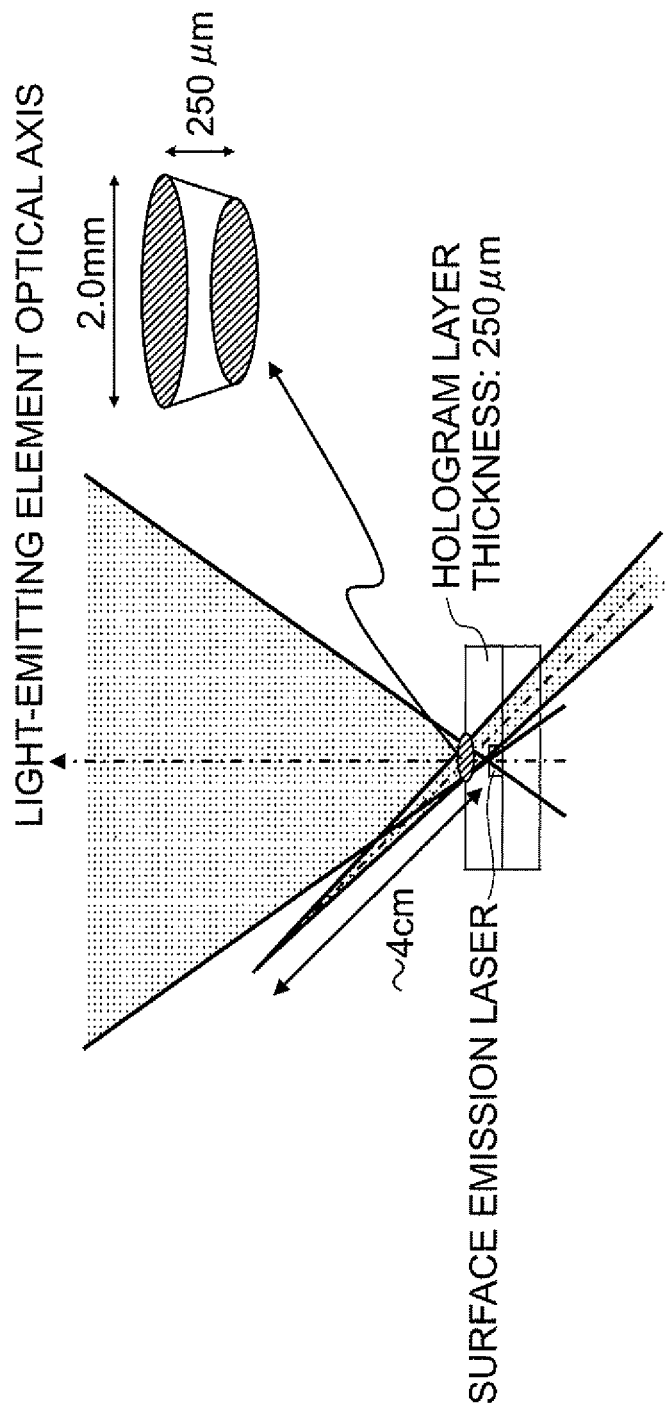

200μm

FAST SCANNING DIRECTION

200μm

EXPOSURE DEVICE AND IMAGE FORMING APPARATUS

CROSS-REFERENCE TO RELATED APPLICATION

This application claims priority under 35 USC 119 from Japanese Patent Application No. 2009-095326 filed on Apr. 9, 2009.

BACKGROUND

1. Technical Field

The present invention relates to an exposure device and an image forming apparatus.

2. Related Art

Heretofore, in a copier, printer or the like that forms images by an electrophotography system, a laser ROS (raster output scanner) system exposure device, which scans light emitted from a laser light source with a polygon mirror, has been used as an exposure device for writing a latent image onto a photosensitive drum. Recently, LED system exposure devices that use light-emitting diodes (LEDs) for light sources have been coming to dominance in place of laser ROS system exposure devices. An LED system exposure device is referred to as an LED print head, or as an LPH for short.

An LED print head is provided with an LED array, in which numerous LEDs are arranged on an elongated support, and a lens array in which numerous graded index-type rod lenses are arranged. In the LED array, the numerous LEDs are arranged to correspond with a number of pixels in a main scanning direction (fast scanning direction), for example, 1200 pixels per inch (i.e., 1200 dpi). Cylindrical rod lenses, typified by SELFOC (registered trademark) lenses, are used as the graded index rod lenses.

In the LED print head, the light emitted from each LED is condensed by the rod lens, and an erect unit magnification image is focused on a photosensitive drum. Therefore, the scanning optical system of a laser ROS system is not required, and a great reduction in size compared to a laser ROS system is possible. Moreover, a driving motor for driving a polygon mirror is not required, which has the advantage that mechanical noise is not produced.

A number of technologies have been proposed in which, in an LED print head, an array of hologram elements is used instead of the rod lenses.

Because electrophotography system exposure devices in which LED print heads use LED arrays are common, these exposure systems are widely referred to as LED systems. However, because light-emitting elements are not necessarily limited to LEDs, hereinafter, an LED system will instead be referred to where appropriate as a light-emitting element array system.

SUMMARY

An aspect of the present invention provides an exposure device including: a light-emitting element array that is provided with an elongated support and plural light-emitting elements formed on the support, the plural light-emitting elements being arranged in at least one row along a length direction of the support such that a spacing along the support length direction between two adjacent light-emitting elements is a pre-specified first spacing; and a hologram element array that is provided with a hologram recording layer disposed over the support and plural hologram elements formed in the hologram recording layer, the plural hologram elements corresponding with each of the plurality of light-emitting elements and being formed such that a spacing along the support length direction between two adjacent hologram elements is the first spacing, and a diameter in the support length direction of each of the plural hologram elements being larger than the first spacing, such that a respective light emitted from each of the plural light-emitting elements is diffracted and focused toward a pre-specified image-forming plane by the corresponding hologram element.

BRIEF DESCRIPTION OF THE DRAWINGS

Exemplary embodiments of the present invention will be described in detail based on the following figures, wherein:

FIG. 2 is a schematic perspective view illustrating an example of structure of an LED print head that serves as an exposure device relating to the exemplary embodiment of the present invention;

FIG. 6A to FIG. 6E are process diagrams illustrating steps in fabrication of the LED print head;

FIG. 7 is a schematic diagram illustrating a state in which diffracted light is reproduced from a volume hologram formed in Example 1;

DETAILED DESCRIPTION

Herebelow, an example of an exemplary embodiment of the present invention will be described in detail with reference to the drawings.

—Image Forming Apparatus—

Figure 1:
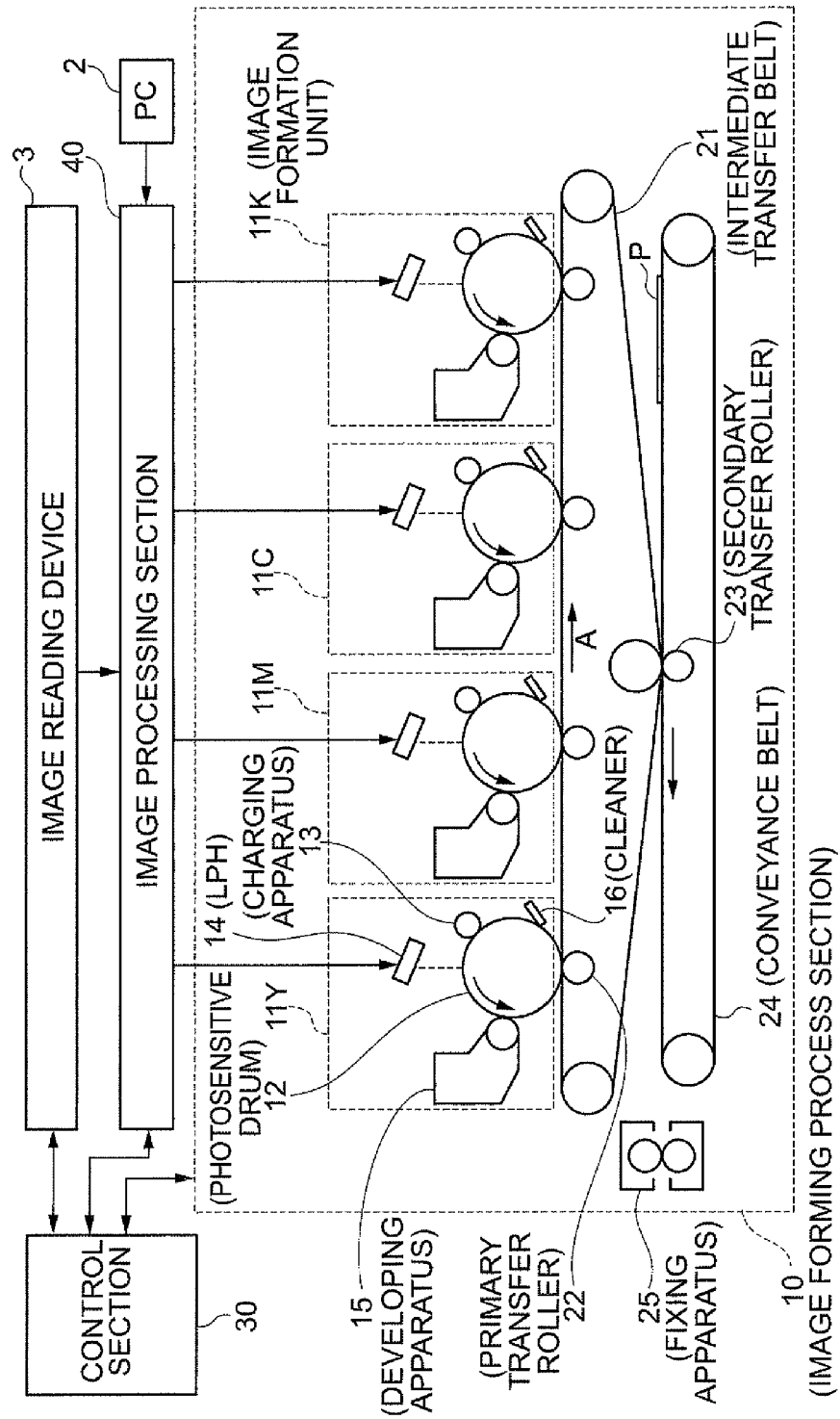
FIG. 1 is a schematic diagram illustrating an example of structure of an image forming apparatus relating to an exemplary embodiment of the present invention.

FIG. 1 is a schematic diagram illustrating an example of structure of an image forming apparatus relating to an exemplary embodiment of the present invention.

This image forming apparatus is what is known as a tandem digital color printer, and is equipped with an image forming process section 10, a control section 30 and an image processing section 40. The image forming process section 10 is an image forming section that carries out image formation in accordance with image data of respective colors. The control section 30 controls operations of the image forming apparatus. The image processing section 40 is connected to an image reading device 3 and an external device such as, for example, a personal computer (PC) 2 or the like, and applies predetermined image processing to image data received from these devices.

The image forming process section 10 is equipped with four image formation units 11Y, 11M, 11C and 11K, which are arranged in a row with a constant spacing. The image formation units 11Y, 11M, 11C and 11K form toner images of, respectively, yellow (Y), magenta (M), cyan (C), and black (K). Herein, the image formation units 11Y, 11M, 11C and 11K are together referred to as image formation units 11 where appropriate.

Each image formation unit 11 is equipped with a photosensitive drum 12, a charging device 13, an LED print head (LPH) 14, a developing device 15 and a cleaner 16. The photosensitive drum 12 is an image-bearing body at which an electrostatic latent image is formed and that carries a toner image. The charging device 13 uniformly charges a surface of the photosensitive drum 12 to a predetermined potential. The LPH 14 is an exposure device that exposes onto the photosensitive drum 12 that has been charged up by the charging device 13. The developing device 15 develops an electrostatic latent image provided by the LPH 14. After a transfer, the cleaner 16 cleans the surface of the photosensitive drum 12.

The LPH 14 is an elongated print head with a length substantially the same as an axial direction length of the photosensitive drum 12. At the LPH 14, plural LEDs are arranged in an array along the length direction. The LPH 14 is disposed at a perimeter of the photosensitive drum 12 such that the length direction of the LPH 14 is along the axial direction of the photosensitive drum 12. In the present exemplary embodiment, a working distance of the LPH 14 is far, being disposed to be separated by several centimeters from the surface of the photosensitive drum 12. Therefore, a width of occupancy in the peripheral direction of the photosensitive drum 12 is small, and crowding of the periphery of the photosensitive drum 12 is ameliorated.

The image forming process section 10 is also provided with an intermediate transfer belt 21, a primary transfer roller 22, a secondary transfer roller 23 and a fixing device 25. The toner images of the respective colors that are formed on the photosensitive drums 12 of the image formation units 11 are superposedly transferred onto the intermediate transfer belt 21. The primary transfer roller 22 sequentially transfers (primary-transfers) the toner images of the respective colors at the image formation units 11 onto the intermediate transfer belt 21. The secondary transfer roller 23 collectively transfers (secondary-transfers) the superposed toner image that has been transferred onto the intermediate transfer belt 21 onto paper P, which is a recording medium. The fixing device 25 fixes the secondary-transferred image to the paper P.

Next, operations of the above described image forming apparatus will be described.

Firstly, the image forming process section 10 carries out an image formation operation on the basis of control signals, such as synchronous signals provided from the control section 30 or the like. At this time, image data, which is inputted from the image reading device 3, the personal computer 2 or the like, is subjected to image processing by the image processing section 40 and is provided to the image formation units 11 through an interface.

For example, in the image formation unit 11Y for yellow, the surface of the photosensitive drum 12 that has been uniformly charged to the predetermined potential by the charging device 13 is exposed by the LPH 14 emitting light in accordance with image data provided from the image processing section 40, and an electrostatic latent image is formed on the photosensitive drum 12. That is, the surface of the photosensitive drum 12 is fast-scanned by the LEDs of the LPH 14 emitting light on the basis of the image data, and the surface of the photosensitive drum 12 is slow-scanned by the photosensitive drum 12 rotating. Thus, the electrostatic latent image is formed on the photosensitive drum 12. The electrostatic latent image that has been formed is developed by the developing device 15 to form a yellow toner image on the photosensitive drum 12. Similarly, toner images of the colors magenta, cyan and black are formed at the image formation units 11M, 11C and 11K.

The color toner images formed by the image formation units 11 are successively electrostatically attracted by the primary transfer roller 22 and transferred onto the intermediate transfer belt 21, which turns in the direction of arrow A in FIG. 1 (primary transfer). Thus, a superposed toner image is formed on the intermediate transfer belt 21. By the movement of the intermediate transfer belt 21, the superposed toner image is conveyed to a range in which the secondary transfer roller 23 is disposed (a secondary transfer portion). When the secondary toner image is conveyed to the secondary transfer portion, a paper P is supplied to the secondary transfer portion to match the timing at which the toner image is conveyed to the secondary transfer portion.

Then, the superposed toner image is collectively electrostatically transferred (secondary transfer) onto the paper P that has been conveyed thereto, by a transfer electric field that is formed by the secondary transfer roller 23 at the secondary transfer portion. The paper P to which the superposed toner image has been electrostatically transferred is separated from the intermediate transfer belt 21 and is conveyed to the fixing device 25 by a conveyance belt 24. The unfixed toner image on the paper P that has been conveyed to the fixing device 25 is subjected to fixing processing by heat and pressure from the fixing device 25, and thus is fixed onto the paper P. Then, the paper P at which a fixed image is formed is ejected to an ejection tray (not shown) that is provided at an ejection portion of the image forming apparatus.

Now, when the working distance of the LPH is greater, the periphery of the photosensitive drum is less crowded, and a reduction in size of the image forming apparatus as a whole is enabled. With a related art LPH, the optical path length from end faces of a lens array of rod lenses to a focusing position (the working distance) is short, in the order of a few millimeters, and a proportion of the periphery of the photosensitive drum that is occupied by the exposure device is large. Furthermore, in general, with an LPH that uses LEDs that emit incoherent light, coherence is low and spot blurring (referred to as a chromatic aberration) occurs, and it is not easy to form microscopic spots.

—LED Print Head (LPH)—
—Structure of the LPH—

Figure 3A:
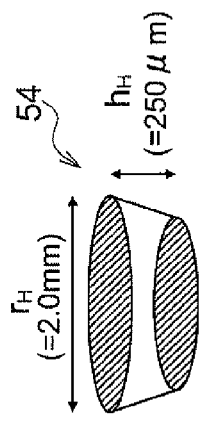
FIG. 3A is a perspective view illustrating the general shape of a hologram element.
Figure 3B:
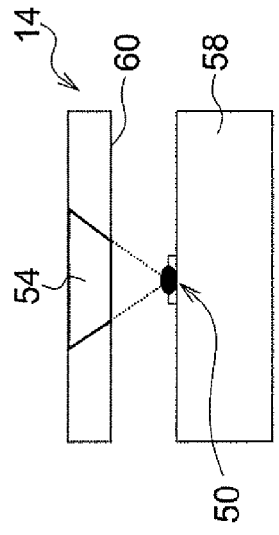
FIG. 3B is a sectional diagram of the LED print head in a slow scanning direction.
Figure 3C:
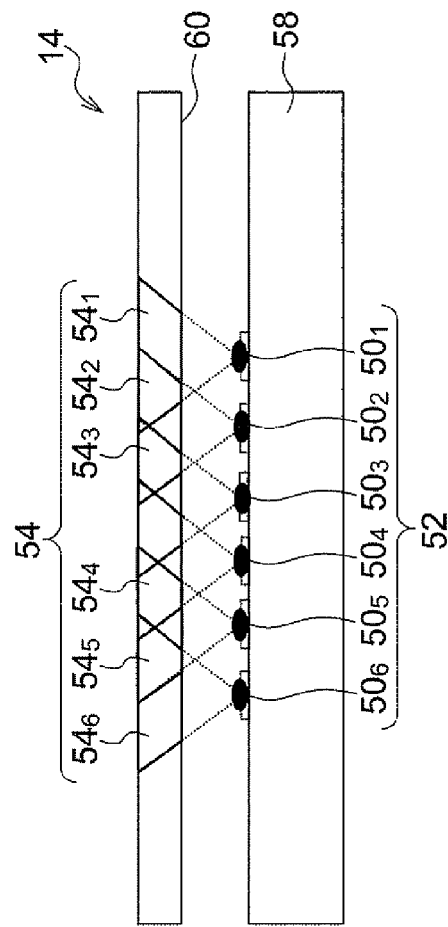
FIG. 3C is a sectional diagram of the LED print head in a fast scanning direction.

FIG. 2 is a schematic perspective view illustrating an example of structure of an LED print head that serves as an exposure device relating to the exemplary embodiment of the present invention. FIG. 3A is a perspective view illustrating the general shape of a hologram element, FIG. 3B is a sectional diagram of the LED print head in the slow scanning direction, and FIG. 3C is a sectional diagram of the LED print head in the fast scanning direction.

As shown in FIG. 2, the LED print head (LPH 14) is provided with an LED array 52, which is equipped with plural LEDs 50, and a hologram element array 56, which is equipped with plural hologram elements 54 disposed in respective correspondence with the plural LEDs 50. In the example illustrated in FIG. 2, the LED array 52 is equipped with six LEDs $50_1$ to $50_6$, and the hologram element array 56 is equipped with six hologram elements $54_1$ to $54_6$. Herein, where it is not necessary to individually distinguish these, the LEDs $50_1$ to $50_6$ are together referred to as the LEDs 50, and the hologram elements $54_1$ to $54_6$ are together referred to as the hologram elements 54.

The plural LEDs 50 are mounted on an elongated LED support 58 along with driving circuits (not shown) that drive the respective LEDs 50. As mentioned above, the LEDs 50 are arranged along the direction parallel to the axial direction of the photosensitive drum 12. The direction of arrangement of the LEDs 50 is the fast scanning direction. The LEDs 50 are arranged such that a spacing between two mutually adjacent LEDs 50 (light emission points) in the fast scanning direction (a light emission point pitch) is a constant spacing. Herein, slow scanning is implemented by rotation of the photosensitive drum 12, and a direction orthogonal to the fast scanning direction is referred to as the slow scanning direction.

The hologram element array 56 is formed in a hologram recording layer 60 that is formed on the LED support 58. As will be described later, the LED support 58 and the hologram recording layer 60 need not be in close contact. In the example in FIG. 3B and FIG. 3C, the hologram recording layer 60 is disposed to be separated from the LED support 58 by a predetermined height and is retained by an unillustrated retaining member.

The hologram recording layer 60 is constituted of a polymer material that is capable of permanently recording and retaining holograms. A "photopolymer" may be used as this polymer material. A photopolymer utilizes changes in refractive index that are caused by photopolymerization of a photopolymerizable monomer to record a hologram. The hologram elements 54 are arranged along the fast scanning direction in the same manner as the LEDs 50, to respectively correspond with the LEDs 50. The hologram elements 54 are arranged such that the fast scanning direction spacing between two mutually adjacent hologram elements 54 is the same spacing as the aforementioned light emission point pitch.

As illustrated in FIG. 3A and FIG. 3B, each hologram element 54 is formed in a truncated circular cone shape, which converges toward the LED 50 with a bottom face at a front face side of the hologram recording layer 60. Circular truncated cone-shape hologram elements will be described for this exemplary embodiment, but the shapes of hologram elements are not to be limited by this. For example, shapes such as circular cones, elliptical cones, truncated elliptical cones and the like may be formed. The diameter of the circular truncated cone-shape hologram element 54 is largest at the bottom face. The diameter of this circular bottom face is referred to as a hologram diameter $r_H$. Each of the hologram elements 54 has the hologram diameter $r_H$, which is larger than the light emission point pitch. As an example, the light emission point pitch is 30 μm, the hologram diameter $r_H$ is 2 mm, and a hologram thickness $h_H$ is 250 μm. Thus, as is illustrated in FIG. 2 and FIG. 3C, pairs of mutually adjacent hologram elements 54 are formed so as to greatly overlap with one another.

Each of the plural LEDs 50 is disposed on the LED support 58 with a light emission face oriented toward the front face side of the hologram recording layer 60 so as to emit light at the corresponding hologram element 54. A light emission optical axis of the LED 50 passes close to a center of the corresponding hologram element 54 (the axis of symmetry of the circular truncated cone, and is oriented in a direction orthogonal to the LED support 58. As illustrated, the light emission optical axis is orthogonal to both of the aforementioned fast scanning direction and the slow scanning direction.

As the LED array 52, it is preferable to use an SLED (self-scanning LED) array, which is structured by a plural number of SLED chips (not shown) being arranged in a row. Plural self-scanning LEDs are arranged on the SLED chips. Each SLED in an SLED array may be selectively caused to emit light by a switch being turned on and off with two signal lines. Thus, data lines may be shared. By using such an SLED array, a number of lines on the LED support 58 may be kept small.

Although not illustrated, the LPH 14 is retained by a retaining member such as a housing, a holder or the like and is attached at a predetermined position in the image formation unit 11, such that diffracted lights emitted by the hologram elements 54 are emitted toward the photosensitive drum 12. It is preferable if the LPH 14 is structured to be movable in the optical axis direction of the diffracted light, by an adjustment component such as an adjustment screw (not shown) or the like. Image-forming positions according to the hologram elements 54 (a focusing plane) are adjusted by the adjustment component so as to be positioned on the surface of the photosensitive drum 12. It is also preferable to form a protective layer on the hologram recording layer 60, of a cover glass, a transparent resin or the like. The adherence of undesired matter is prevented by this protective layer.

—Operation of the LPH—

Next, operations of the LPH 14 will be briefly described.

Figure 4B:
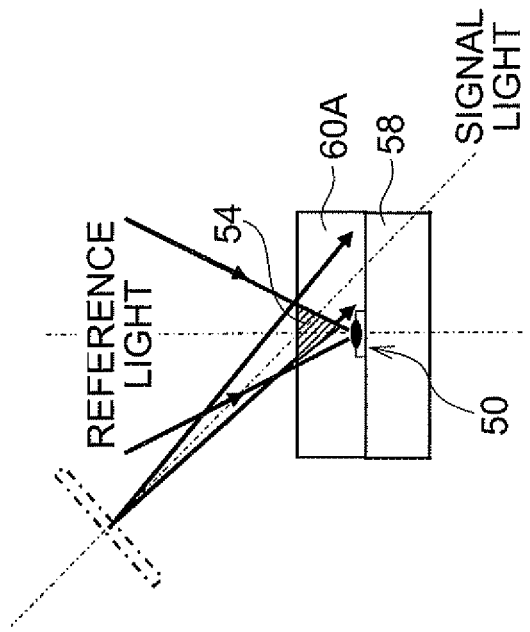
FIG. 4A and FIG. 4B are diagrams illustrating states in which the hologram element is formed in a hologram recording layer.
Figure 4A:
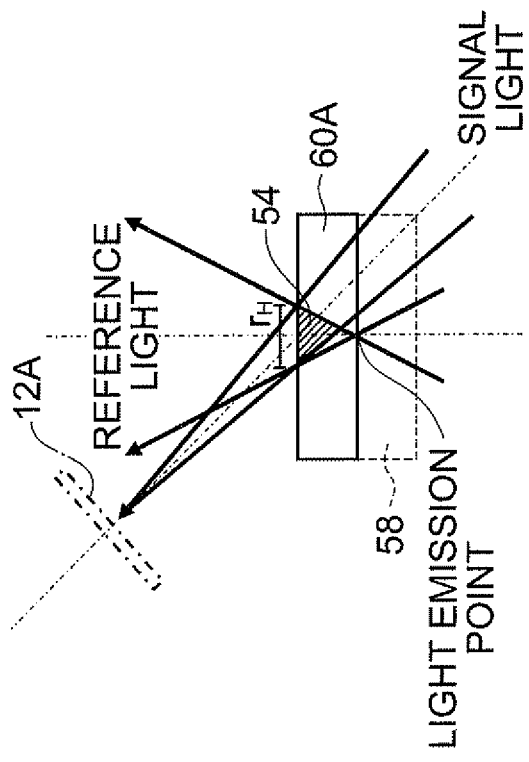

Firstly, a principle of recording and reproduction of the hologram elements 54 will be briefly described. FIG. 4A is a diagram illustrating a state in which a hologram element is formed in a hologram recording layer. The photosensitive drum 12 is not illustrated; only a surface 12A is illustrated, which is an image-forming plane. A hologram recording layer 60A is a recording layer prior to the hologram element 54 being formed. Appending the letter "A" to the reference numeral distinguishes the hologram recording layer 60A from the hologram recording layer 60 in which the hologram elements 54 have been formed.

As illustrated in FIG. 4A, coherent light that passes along light paths of diffracted light that is to be focused on the surface 12A is illuminated onto the hologram recording layer 60A to serve as signal light. At the same time, coherent light that passes along light paths of spreading light that spreads from the light emission point to the desired hologram diameter $r_H$ when passing through the hologram recording layer 60A is illuminated onto the hologram recording layer 60A to serve as reference light. Laser light sources such as semiconductor lasers or the like are used for the illumination of coherent light.

The signal light and the reference light are illuminated onto the hologram recording layer 60A from the same side (the side at which the LED support 58 will be disposed). An interference pattern (intensity distribution) that is obtained by interference between the signal light and the reference light is recorded through the thickness direction of the hologram recording layer 60A. Thus, the hologram recording layer 60 in which the transmission-type hologram elements 54 are formed is obtained. Each hologram element 54 is a volume hologram recording the intensity distribution of the interference pattern in surface directions and the thickness direction. This hologram recording layer 60 is mounted over the LED support 58 on which the LED array 52 is mounted, and thus the LPH 14 is fabricated.

Herein, the hologram recording layer 60A may be formed to touch against the LEDs 50, or may be separated with an air layer, a transparent resin layer or the like interposed. If the hologram recording layer 60A is in contact with the LEDs 50, the hologram elements 54 are formed in circular cone shapes or elliptical cone shapes, and if the hologram recording layer 60A is separated, the hologram elements 54 are formed in truncated circular cone shapes as illustrated in FIG. 3A (or truncated elliptical cone shapes). Similarly to FIG. 4A, FIG. 4B is a diagram illustrating a state in which a hologram element is formed in the hologram recording layer. This differs from the formation method in FIG. 4A in that the signal light and the reference light are illuminated from the front face side of the hologram recording layer 60A. That is, the hologram is recorded by phase-conjugate waves. This formation method will be described in more detail later, in the form of a process of fabrication of the LPH 14.

Figure 5B:
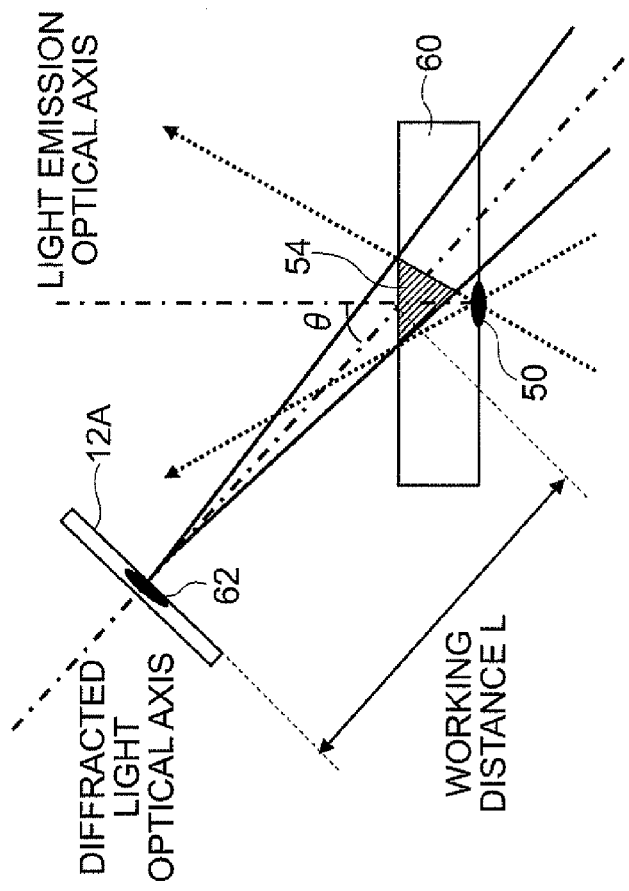
FIG. 5A and FIG. 5B are diagrams illustrating a state in which diffracted light is produced from the hologram element.
Figure 5A:
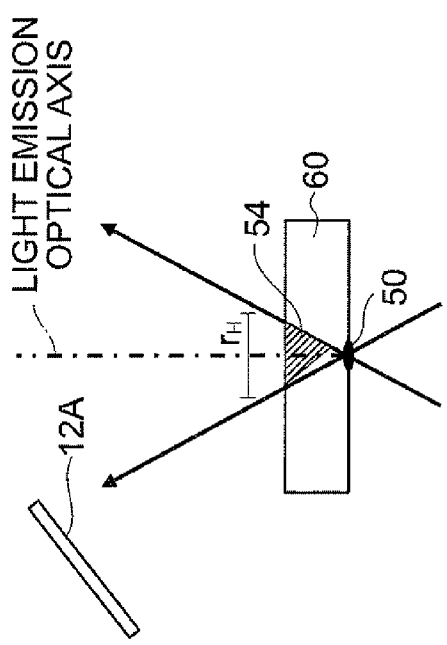

FIG. 5A and FIG. 5B are diagrams illustrating a state in which diffracted light is produced from a hologram element. As illustrated in FIG. 5A, when the LED 50 emits light, the light emitted from the LED 50 passes along optical paths of spreading light that spreads from the light emission point to the hologram diameter $r_H$. By the light emission from the LED 50, the same state arises as when the reference light is illuminated at the hologram element 54.

As illustrated in FIG. 5B, consequent to the illumination of the reference light, shown by broken lines, light the same as the signal light from the hologram element 54 is reproduced, as shown by the solid lines, and is emitted as diffracted light. The emitted diffracted light converges and is focused on the surface 12A of the photosensitive drum 12 at the working distance of several cm. A spot 62 is formed at the surface 12A. Volume holograms in particular have high incidence angle selectivity and wavelength selectivity, and accurately reproduce signal light. Thus, a microscopic spot with a sharp outline is formed at the surface 12A.

Here, the light path of the diffracted light focused at the surface 12A coincides with the light path of the signal light. If the signal light and the reference light have been caused to interfere to record the hologram element 54 such that the light path of the signal light and the light path of the reference light intersect at a pre-specified angle θ, the diffracted light is emitted in a direction that forms the angle θ with the light emission optical axis.

Similarly, as illustrated in FIG. 2, in the LPH 14 provided with the LED array 52 and the hologram element array 56, the respective lights emitted from the six LEDs $50_1$ to $50_6$ are incident on the corresponding hologram elements $54_1$ to $54_6$. The hologram elements $54_1$ to $54_6$ diffract the incident lights and generate diffracted lights. The diffracted lights generated by the respective hologram elements $54_1$ to $54_6$ are emitted toward the photosensitive drum 12, and are focused in the direction of the photosensitive drum 12. The optical axis directions of the diffracted lights are oriented toward the photosensitive drum 12.

The emitted diffracted lights converge toward the photosensitive drum 12 and are focused at the surface of the photosensitive drum 12, which is disposed in the image-forming plane several cm distant. That is, each of the plural hologram elements 54 functions as an optical member that diffracts and focuses the light emitted from the corresponding LED 50, and focuses the light on the surface of the photosensitive drum 12. At the surface of the photosensitive drum 12, microscopic spots $62_1$ to $62_6$ of the diffracted lights are formed so as to be arrayed in the fast scanning direction. In other words, the photosensitive drum 12 is fast-scanned by the LPH 14. Herein, where it is not necessary to individually distinguish between the spots $62_1$ to $62_6$, they are together referred to as spots 62.

—Sizes of Elements of the LPH—

An example in which the six LEDs $50_1$ to $50_6$ are arrayed in a single row is schematically illustrated in FIG. 2. However, thousands of the LEDs 50 may be arrayed, depending on the fast scanning direction resolution of the image forming apparatus. For example, describing an SLED array as an example, 128 LEDs are arranged with a spacing of 1200 spi (spots per inch) in each SLED chip, and 58 of the SLED chips are arranged in a straight row to constitute the SLED array. Put another way, in an image forming apparatus with a resolution of 1200 dpi, 7,424 SLEDs are arranged with a spacing of 21 µm.

When light is condensed by a condensing lens and a spot is formed, a limit on miniaturization of the spot is determined in accordance with the phenomenon of optical diffraction. The spot that is formed by the condensing lens is referred to as an Airy disc, from the following relationship. A diameter (spot size) φ of the Airy disc is expressed, using a wavelength λ and a numerical aperture NA of the condensing lens, by $\phi=1.22\lambda/NA$ ($=2.44\lambda F$). Therefore, if a working distance ($\approx$focusing distance) is f, then $f=r_H\phi/2.44\lambda$.

NA=sin θ=$r_H/2f$

F(F-number)=$f/r_H$ f: working distance $f=r_H\phi/2.44\lambda$

In a related art LPH that employs a hologram element array, each of plural hologram elements is fabricated with a diameter of not more than an LED pitch spacing (light emission point pitch), such that the hologram elements do not overlap with one another, similarly to a case in which plural lenses are arrayed in correspondence with respective LEDs. The light emission point pitch is tens of microns, a distance substantially the same as a microscopic spot spacing (pixel pitch) of the microscopic spots that are formed on a photosensitive drum. With hologram elements that have diameters of tens of microns, because of spreading of the beams due to diffraction (the diffraction limit), a working distance in the order of only a few millimeters may be obtained, similarly to rod lenses. In contrast, in the present exemplary embodiment, the diameters of the hologram elements are larger than the light emission point pitch, and a working distance in the order of centimeters is realized.

For example, if the diameter of the hologram elements is made lower than the light emission point pitch as in the related art, with a resolution of 1200 dpi, the hologram size $r_H$ must be reduced to no more than about 20 µm. In such a case, if the wavelength is 780 nm, then even if a spot size up to around 40 µm is allowed, the working distance has a maximum limit of 420 µm. Thus, with a related art technology, the working distance may not be increased to the order of centimeters.

In contrast, if the diameter of hologram elements is made greater than the light emission point pitch, as in the present exemplary embodiment, the working distance may be increased to the order of centimeters. For example, by setting the diameter of the hologram elements 54 that function as condensing lenses (the hologram size $r_H$) to 1 mm or above, the working distance may be set to 1 cm or above. For example, as will be described later, with a hologram size $r_H$ of 2 mm and a hologram thickness $h_H$ of 250 μm, a spot size of around 40 μm (a half-maximum width of around 30 μm) at a working distance of 4 cm may be realized.

As mentioned above, it is preferable for the diameter of the hologram elements to be 1 mm or above. If the diameter of the hologram elements exceeds 10 mm, then because a degree of multiplexing of the hologram elements is very high, a problem arises in that diffraction efficiency, which is limited by the dynamic range of the material, falls. Therefore, it is preferable if the diameter of the hologram elements is not more than 10 mm.

—Process of Fabrication of the LPH—

Now, a process of fabrication of the LPH 14 will be described. FIG. 6A to FIG. 6E are process diagrams illustrating steps in fabrication of the LED print head. Broadly, the principle of recording and reproducing the hologram elements 54 is as has been described. In these drawings, slow scanning direction sectional diagrams are illustrated and, although only one each of the LEDs 50 and the hologram elements 54 are illustrated, the process of fabrication of the LPH 14 that is equipped with the LED array 52 and the hologram element array 56 is described.

Firstly, as illustrated in FIG. 6A, the LED array 52 is prepared, in which the plural LEDs 50 are mounted on the LED support 58. An embankment portion 64, for holding in the photopolymer, is formed in a frame shape on peripheral edge portions of the front face of the LED support 58. The embankment portion 64 is formed by, for example, a curable polymer being applied, to substantially the same height as the hologram recording layer 60, and then being cured by heating, light illumination or the like. For example, if thin volume holograms are to be recorded, the thickness of the hologram recording layer 60 will be of the order of several hundred μm, and similarly the embankment portion 64 will be formed to a thickness of several hundred μm. If thick volume holograms are to be recorded, the thickness of the hologram recording layer 60 will be in a range of the order of 1 mm to 10 mm, and similarly the embankment portion 64 will be formed to a thickness of 1 mm to 10 mm.

Next, as illustrated in FIG. 6B, the hologram recording layer 60A is formed on the LED support 58 on whose peripheral edge portions the frame-form embankment portion 64 has been formed. The hologram recording layer 60A is formed by the photopolymer being flowed in from a dispenser to an extent such that the photopolymer does not overflow the embankment portion 64. Next, a thin plate-form cover glass that is transparent with respect to the recording light and the reproduction light is adhered or the like to the surface of the hologram recording layer 60A, to form a protective layer 66 over the hologram recording layer 60A. Thereafter, chip alignment testing is performed and positions of the plural LEDs 50 that are to be light emission points are measured.

Next, as illustrated in FIG. 6C, signal light and reference light are simultaneously illuminated onto the hologram recording layer 60A formed of the photopolymer, from the protective layer 66 side, and the plural hologram elements 54 are formed in the hologram recording layer 60A. Laser light that passes backwards along desired diffraction light paths is illuminated as the signal light. Laser light that passes along light paths of converging light that converges from the desired hologram diameter $r_H$ to the light emission point when passing through the hologram recording layer 60A is illuminated as the reference light. That is, as illustrated in FIG. 4B, the holograms are recorded by phase-conjugate waves. As an example, laser light with a wavelength of 780 nm that is oscillated from a semiconductor laser is employed as the laser light for the signal light and the reference light.

Initially, the signal light and the reference light—the illumination positions, illumination angles, spreading angles, convergence angles and the like of the laser lights—are planned on the basis of measurement data obtained from the aforementioned chip alignment testing and design values of the hologram elements 54 (the hologram diameter $r_H$ and the hologram thickness $h_H$). Hence, writing optical systems are disposed in order to illuminate the planned signal light and reference light.

With the writing optical systems being kept fixedly disposed and using converging spherical waves as the reference light, the LED support 58 on which the hologram recording layer 60A is formed is moved relative to the reference light and the signal light. The LED support 58 is moved by the light emission point pitch such that the reference light successively converges on each of the plural LEDs 50. Thus, the plural hologram elements 54 are multiplexedly recorded in the hologram recording layer 60A by spherical wave shift multiplexing.

Next, as illustrated in FIG. 6D, the whole area of the hologram recording layer 60A is exposed with ultraviolet light irradiation, and the photopolymerizable monomer is completely polymerized. A refractive index distribution in the hologram recording layer 60A is fixed by this fixing processing. As an example, the photopolymer may be provided as a mixture of a photopolymerizable monomer and a separate non-polymerizable compound. In this case, when an interference pattern is illuminated onto the photopolymer, the photopolymerizable monomer polymerizes at bright portions and a concentration gradient of the photopolymerizable monomer is formed. As a result, the photopolymerizable monomer is dispersed to bright portions, and a refractive index distribution between bright portions and dark portions is produced.

The whole area is completely exposed, the photopolymerizable monomer that remains in dark portions is polymerized and the polymerization reaction is concluded, and a state is attained that may not be further written or erased. Formulas based on various recording mechanisms have been proposed for hologram recording materials. As long as a material is capable of recording refractive index modulations in accordance with light intensity distributions, that material may be used for the present invention.

Finally, as illustrated in FIG. 6E, the plural LEDs 50 are successively caused to emit light, and whether or not the desired diffracted light is provided by the hologram element 54 formed in correspondence with each LED 50 is tested. The complete fabrication process ends with this testing step.

Anyway, in the exemplary embodiment described above, an example has been described in which the LEDs 50 and the hologram recording layer 60A are in contact. However, the hologram recording layer 60A may be formed to be separated from the LEDs 50 with an air layer, a transparent resin layer or the like interposed. In this case, a sheet formed by the hologram recording layer being sandwiched between protective layers may be separately fabricated and disposed over the array of light-emitting elements.

In the exemplary embodiment described above, an example has been described in which volume holograms are formed to serve as the hologram elements. However, it is sufficient that hologram elements be formed that have a hologram diameter $r_H$ with which a working distance of 1 cm or more may be obtained. A suitable hologram thickness $h_H$ may be specified in accordance with coherence of the light-emitting elements that are to be used. Examples in which relatively thin volume holograms are employed, with a hologram thickness $h_H$ of 250 μm, will be described in the Examples later.

In the exemplary embodiment described above, an LED print head that is provided with plural LEDs has been described. However, other light-emitting elements may be employed instead of LEDs, such as laser diodes (LD), electroluminescent elements (EL) or the like. The hologram elements are designed in accordance with characteristics of the light-emitting elements, and microscopic spots with sharp outlines may be formed whether LEDs, ELs, etc. that emit incoherent light are used as the light-emitting elements or LDs that emit coherent light are used as the light-emitting elements.

In the exemplary embodiment described above, an example has been described in which the plural hologram elements are multiplexingly recorded by spherical wave shift multiplexing. However, the plural hologram elements may be multiplexingly recorded by another multiplexing system, provided the multiplexing system provides the desired diffracted lights. Further, plural kinds of multiplexing system may be combined. As other multiplexing systems, the following may be mentioned: angle multiplexing recording that records while the incidence angle of the reference light is altered; wavelength multiplexing recording that records while the wavelength of the reference light is altered; phase multiplexing recording that records while the phase of the reference light is altered; and the like. As long as multiplexing recording is possible, separate diffracted lights may be reproduced from the multiplexingly recorded plural holograms without crosstalk.

In the exemplary embodiment described above, it has been described that the image forming apparatus is a tandem digital color printer and that the exposure device that exposes the photosensitive drum at each image formation unit is an LED print head. However, it is sufficient that an image forming apparatus is one at which images are formed by imagewise exposure of a photosensitive image recording medium by an exposure device; the example in the above exemplary embodiment is not to be limiting. For example, the image forming apparatus is not to be limited to an electrophotography-system digital color printer. The exposure device of the present invention may also be installed in writing devices and the like, such as silver salt-based image forming apparatuses, optically written electronic paper and the like, Moreover, a photosensitive image recording medium is not to be limited to the photosensitive drum. The exposure device of the present invention may also be applied to exposure of sheet-form photoreceptors, photographic photosensitive materials, photoresists, photopolymers and so forth.

EXAMPLES

Hereafter, the present invention will be described by Examples. The present invention is not to be limited by these Examples.

Example 1

In Example 1, as illustrated in FIG. 7, a vertical cavity surface emitting laser (VCSEL) with an oscillation wavelength of 780 nm is used as the light-emitting element, and a photopolymer layer with a thickness of 250 μm is formed at the light emission face side of the VCSEL. Laser light emitted from a VCSEL has a specified wavelength and a specified spreading angle. Laser light passing along the light paths of the laser light to be emitted from the VCSEL in the opposite direction is used as reference light. An image-forming plane is specified to be 4 cm distant from the point of intersection of the optical axis of the reference light with the front face of the photopolymer layer. Laser light that spreads from a point in this image-forming plane toward the photopolymer layer was used as signal light. The pitch spacing (array pitch) of the VCSELs is 40 μm.

The wavelengths of the signal light and the reference light are 780 nm. The optical axis of the reference light and the optical axis of the signal light intersect at an angle of 45°. The photopolymer layer is illuminated simultaneously with the signal light and the reference light from the front face side, the signal light and the reference light are interfered in the photopolymer layer, and volume holograms with a hologram diameter $r_H$ of 2 mm and a hologram thickness $h_H$ of 250 μm are formed.

Figure 8A:
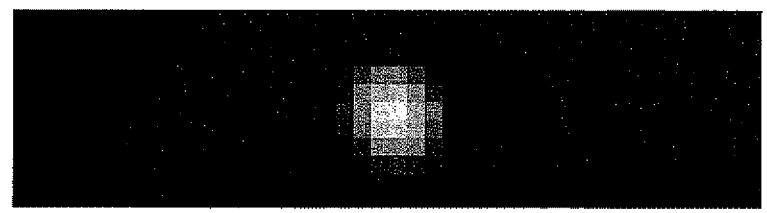
FIG. 8A is a captured image showing the form of a spot that is formed at a focusing plane in Example 1.
Figure 8B:
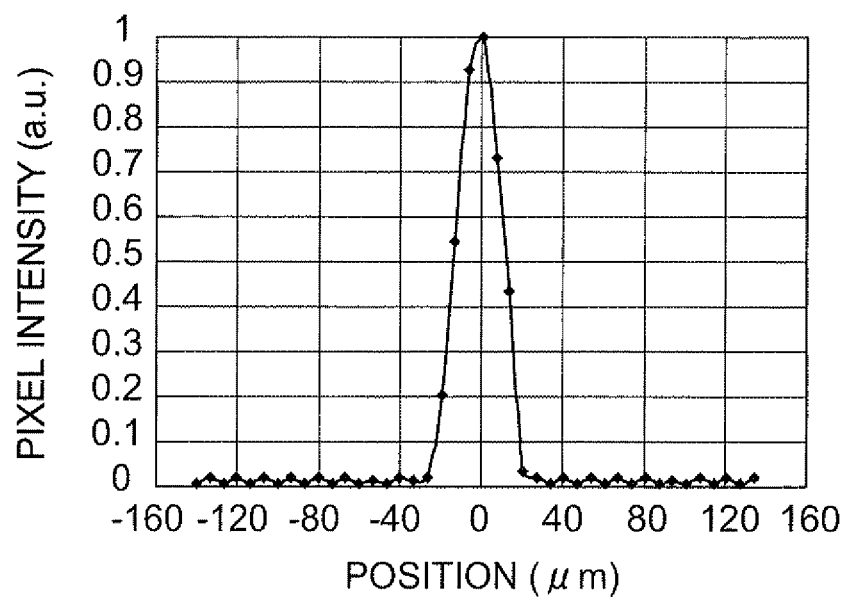
FIG. 8B is a graph showing a spot profile in the fast scanning direction.

Then, the VCSELs are caused to emit light, and laser light emitted from the VCSELs is illuminated as reproduction light at the above-mentioned volume holograms. It is consequently verified, by image capture with an image sensor disposed in the image-forming plane, that a microscopic spot with a half-maximum width of about 30 μm is formed 4 cm distant in a direction forming an angle of 45° with the optical axis of the emitted light. FIG. 8A is a captured image showing the form of the spot at the image-forming plane, and FIG. 8B is a graph showing the spot profile in the fast scanning direction. The vertical axis of the graph shows relative values of pixel intensity with the maximum intensity being 1, and the horizontal axis shows distance from the center of the spot. Here, the term pixel intensity means detected light intensities at respective pixels.

As can be seen from FIG. 8A and FIG. 8B, the pixel intensity decreases rapidly from the center of the spot outward, and is substantially at zero beyond a distance (radius) about 20 μm from the center. That is, although blurring of the spot appears to occur because of coarseness of the pixels of the captured image in FIG. 8A, when judged by the values of pixel intensity in FIG. 8B, it is seen that a microscopic spot with a sharp outline is obtained, From the half-maximum width of the spot profile, a diameter of the microscopic spot of approximately 30 μm is measured.

From the above-described results, it is seen that when coherent reproduction light is illuminated from VCSELs with an array pitch of 40 μm at volume holograms with a hologram diameter $r_H$ of 2 mm and a hologram thickness $h_H$ of 250 μm, a half-maximum width spot size of approximately 30 μm at a working distance of 4 cm may be realized.

Example 2

In Example 2, an SLED with an oscillation wavelength of 780 nm is used as the light-emitting element, and a photopolymer layer with a thickness of 250 μm is formed at the light emission face side of the SLED. Similarly to Example 1, the photopolymer layer is illuminated simultaneously with the signal light and the reference light from the front face side, the signal light and the reference light are interfered in the photopolymer layer, and volume holograms with a hologram diameter $r_H$ of 2 mm and a hologram thickness $h_H$ of 250 μm are formed.

Figure 9:
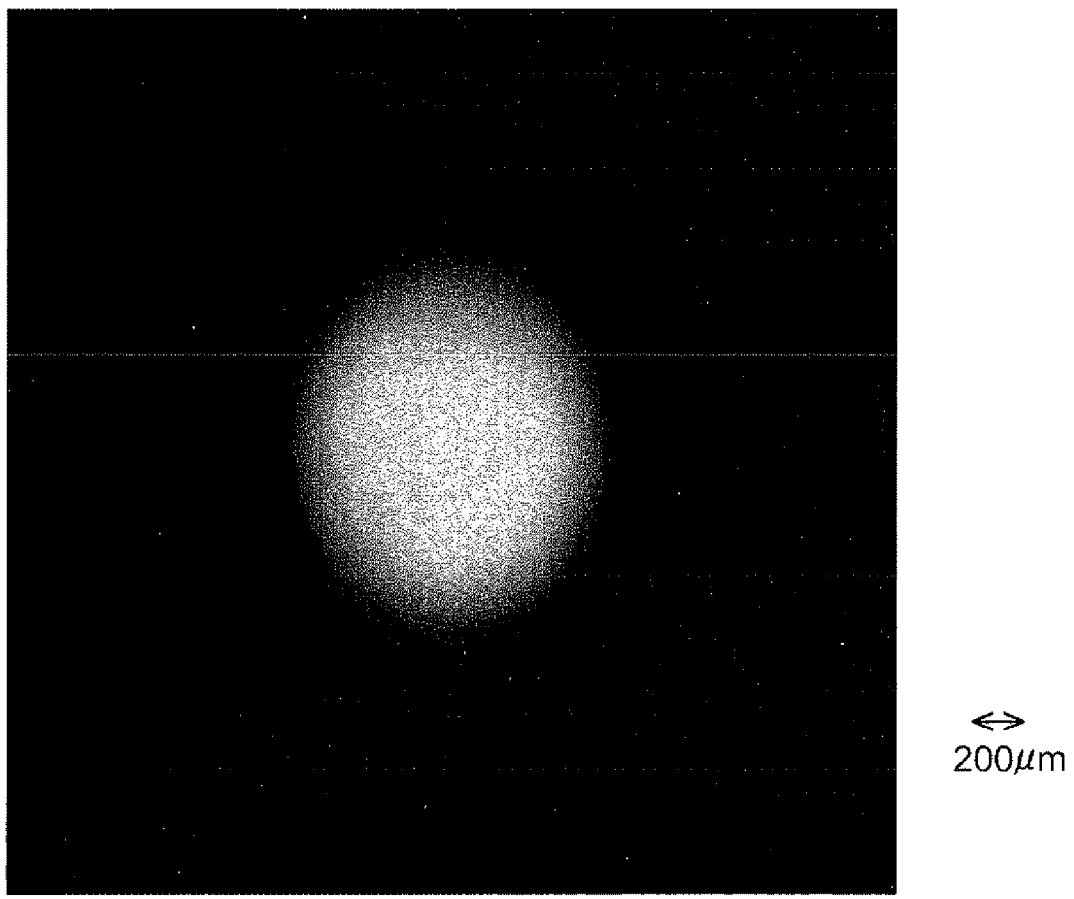
FIG. 9 is a captured image showing the form of a spot that is formed at a focusing plane in Example 2.

Then, the SLEDs are caused to emit light, and the emitted light is illuminated as reproduction light at the above-mentioned volume holograms. It is consequently verified, by image capture with an image sensor disposed in the image-forming plane, that a spot with a diameter of about 1 mm is formed, as shown in FIG. 9, 4 cm distant in a direction forming an angle of 45° with the optical axis of the emitted light. Furthermore, when plural hologram elements are fabricated in association with SLED elements arrayed with a pitch of 40 μm, crosstalk between the hologram elements occurs.

From the above-described results, it is seen that when incoherent reproduction light is illuminated from SLEDs with an array pitch of 40 μm at volume holograms with a hologram diameter $r_H$ of 2 mm and a hologram thickness $h_H$ of 250 μm, while a working distance of 4 cm may be achieved, the beam spots are large and crosstalk between the hologram elements occurs. For application to a high-resolution LED print head, small beam spots and the suppression of cross talk are preferable.

Example 3

In Example 3, an SLED with an oscillation wavelength of 780 nm is used as the light-emitting element, and a photopolymer layer with a thickness of 1 mm is formed at the light emission face side of the SLED. The pitch spacing (array pitch) of the SLEDs is 40 μm. Laser light that converges from the photopolymer layer front face toward the SLED is used as reference light. The image-forming plane is specified to be 2 cm distant from the point of intersection of the optical axis of the reference light with the front face of the photopolymer layer. Laser light that spreads from a point in this image-forming plane toward the photopolymer layer is used as signal light.

The wavelengths of the signal light and the reference light are 780 nm. The optical axis of the reference light and the optical axis of the signal light intersect at an angle of 45°. The photopolymer layer is illuminated simultaneously with the signal light and the reference light from the front face side, the signal light and the reference light are interfered in the photopolymer layer, and volume holograms with a hologram diameter $r_H$ of 4.5 mm and a hologram thickness $h_H$ of 1 mm are formed.

Figure 10A:
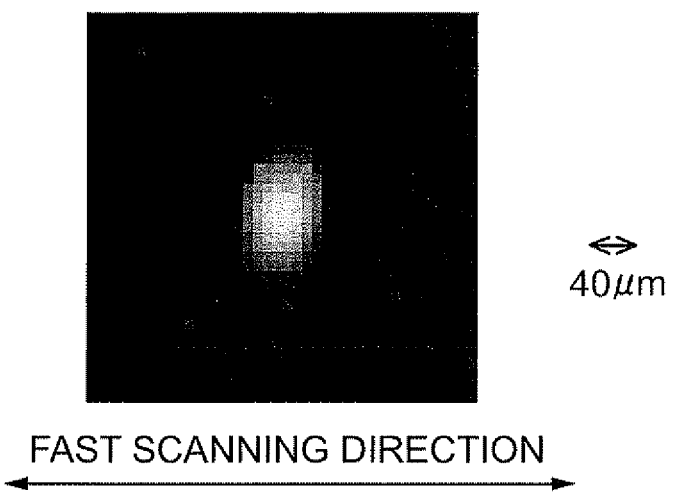
FIG. 10A is a captured image showing the form of a spot that is formed at a focusing plane in Example 3.

Then, the SLEDs are caused to emit light, and the emitted light is illuminated as reproduction light at the above-mentioned volume holograms. It is consequently verified, by image capture with an image sensor disposed in the image-forming plane, that a spot with a half-maximum width of about 40 μm is formed 2 cm distant in a direction forming an angle of 45° with the optical axis of the emitted light. FIG. 10A is a captured image showing the form of the spot at the image-forming plane, and FIG. 10B is a graph showing the spot profile in the fast scanning direction.

Figure 10B:
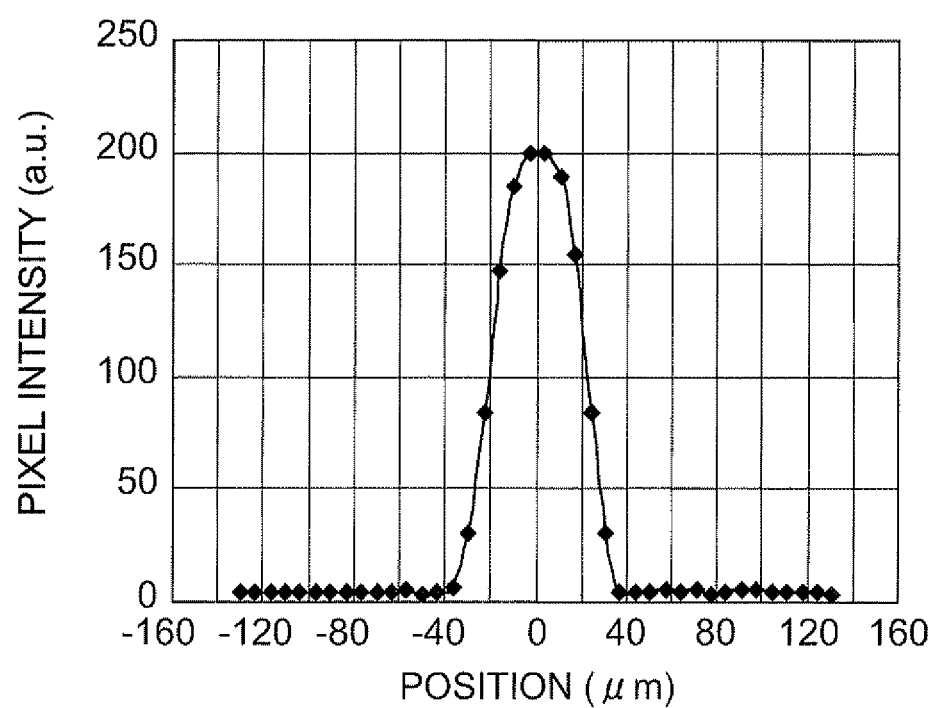
FIG. 10B is a graph showing a spot profile in the fast scanning direction.

As can be seen from FIG. 10A and FIG. 10B, the pixel intensity decreases rapidly from the center of the spot outward, and is substantially at zero beyond a distance (radius) about 40 μm from the center. That is, although blurring of the spot appears to occur because of coarseness of the pixels of the captured image in FIG. 10A, when judged by the values of pixel intensity in FIG. 10B, it is seen that a microscopic spot with a sharp outline is obtained. From the half-maximum width of the spot profile, a diameter of the microscopic spot of approximately 40 μm is measured.

From the above-described results, it is seen that when incoherent reproduction light is illuminated from SLEDs with an array pitch of 40 μm at volume holograms with a hologram diameter $r_H$ of 4.5 mm and a hologram thickness $h_H$ of 1 mm, a half-maximum width spot size φ of approximately 40 μm at a working distance of 2 cm may be realized. When an incoherent LED light source is used, the spot size is larger than with a coherent light source as illustrated in Example 2. However, by the specification of volume holograms of the present invention, satisfactory microscopic spots to serve as an exposure device may be realized.

Example 4

In Example 4, a laser array support is used, at which 20 VCSELs whose oscillation wavelength is 780 nm are arrayed one-dimensionally on the support with a pitch of 40 μm to serve as light-emitting elements, and a photopolymer layer with thickness 250 μm is formed at the light emission face side of the laser array support. Laser light (spherical waves) that converges from the front face of the photopolymer layer toward the VCSELs with an NA of 0.6 is used as reference light. The image-forming plane is specified to be 4 cm distant from the point of intersection of the optical axis of the reference light with the front face of the photopolymer layer. Laser light that spreads from a point in this image-forming plane toward the photopolymer layer is used as signal light. The wavelengths of the signal light and the reference light are 780 nm. The optical axis of the reference light and the optical axis of the signal light intersect at an angle of 45°.

Figure 11A:
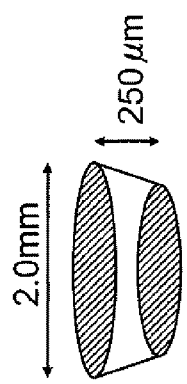
FIG. 11A is a diagram illustrating the shape of a volume hologram formed in Example 4.
Figure 11B:
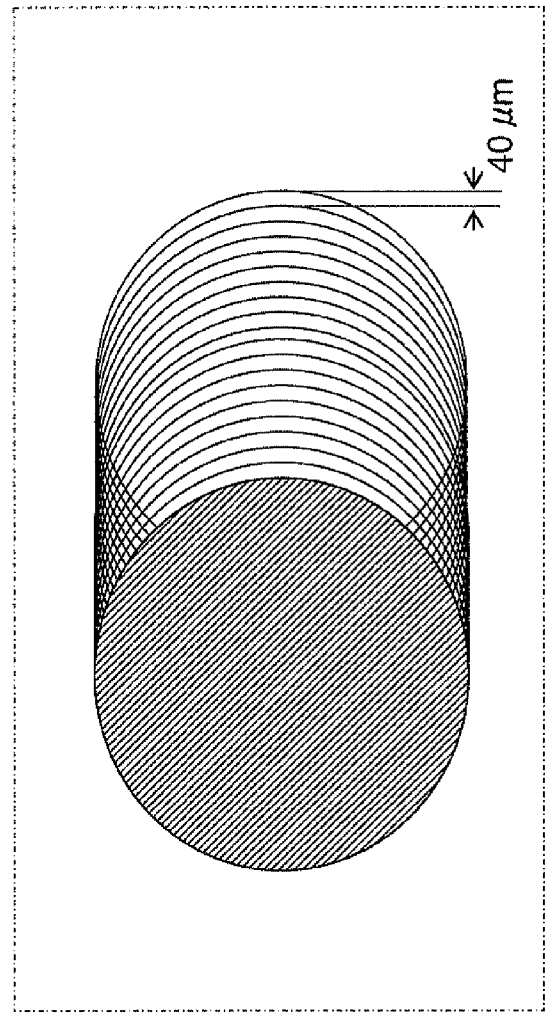
FIG. 11B is a diagram illustrating a state in which plural volume holograms are multiplexingly recorded in the fast scanning direction.

The photopolymer layer is illuminated simultaneously with the signal light and the reference light from the front face side, while the laser array support is moved in the VCSEL arrangement direction at a pitch of 40 μm. At each of the 20 VCSELs, the signal light and the reference light are interfered in the photopolymer layer, and volume holograms with a hologram diameter $r_H$ of 2 mm and a hologram thickness $h_H$ of 250 μm are formed, as illustrated in FIG. 11A. As illustrated in FIG. 11B, the 20 volume holograms are multiplexingly recorded at the pitch of 40 μm by spherical wave shift multiplexing.

Then, the 20 VCSELs are successively caused to emit light, and the laser lights emitted from the VCSELs are illuminated as reproduction lights at the above-mentioned volume holograms. It is consequently verified, by image capture with an image sensor disposed in the image-forming plane, that 20 microscopic spots are formed 4 cm distant in a direction forming an angle of 45° with the optical axis of the emitted light, without crosstalk. The 20 microscopic spots respectively have a diameter of approximately 30 μm and are formed with a pitch of 40 μm in the fast scanning direction.

Figure 12A:
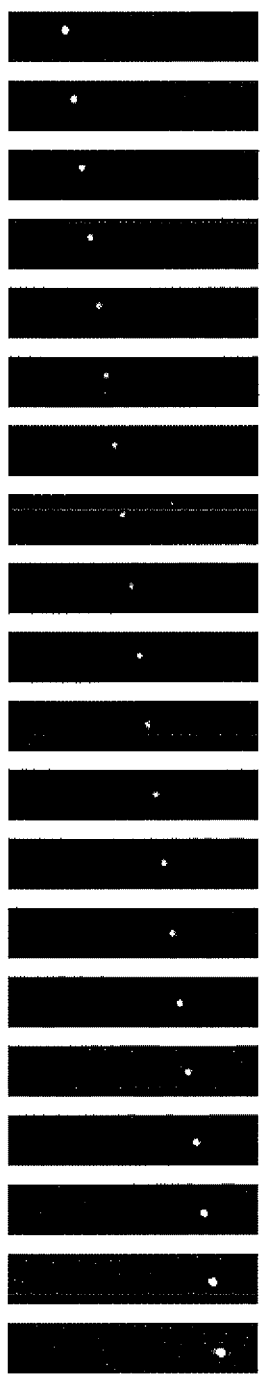
FIG. 12A is captured images showing the spot forms of spots that are sequentially imaged at a focusing plane.
Figure 12B:
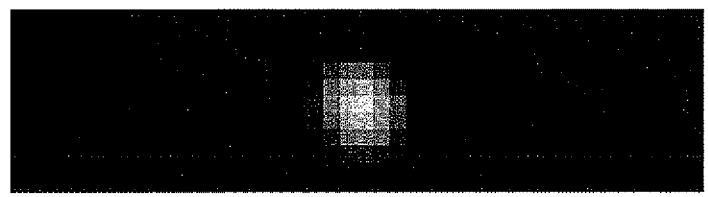
FIG. 12B is a captured image showing the spot form of a tenth spot.
Figure 12C:
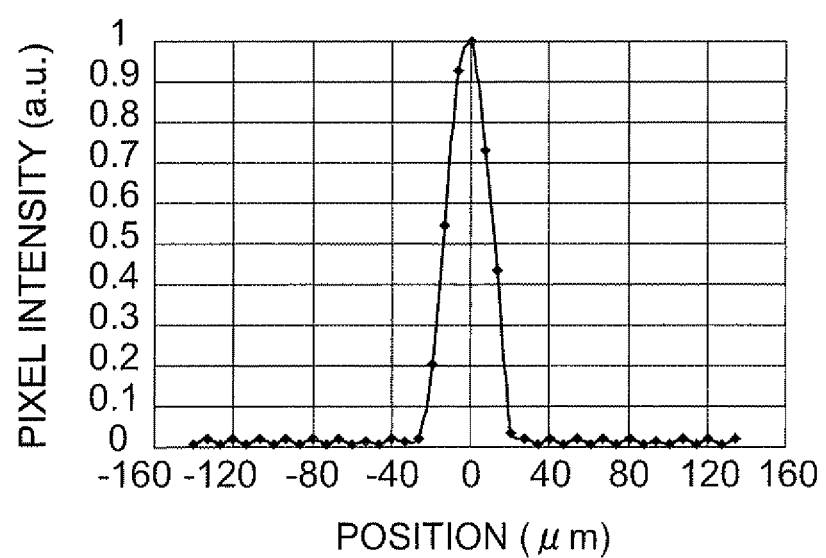
FIG. 12C is a graph showing a spot profile in the fast scanning direction.

FIG. 12A is captured images showing the forms of the spots at the image-forming plane, FIG. 12B is a captured image showing the spot form of a tenth spot, and FIG. 12C is a graph showing the spot profile in the fast scanning direction. The vertical axis of the graph shows relative values of pixel intensity with the maximum intensity being 1, and the horizontal axis shows distance from the center of the spot.

As can be seen from FIG. 12A, the 20 microscopic spots are respectively formed without crosstalk at the pitch of 40 μm in the fast scanning direction. As can be seen from FIG. 12B and FIG. 12C, the pixel intensity decreases rapidly from the center of a spot outward, and is substantially at zero beyond a distance (radius) about 20 μm from the center. That is, although blurring of the spot appears to occur because of coarseness of the pixels of the captured image in FIG. 12B, when judged by the values of pixel intensity in FIG. 12C, it is seen that a microscopic spot with a sharp outline is obtained. From the half-maximum width of the spot profile, a half-maximum width of the microscopic spots of approximately 30 μm is measured.

From the above-described results, it is seen that when coherent reproduction lights are illuminated from VCSELs at each of plural volume holograms with a hologram diameter $r_H$ of 2 mm and a hologram thickness $h_H$ of 250 μm, which have been multiplexingly recorded at a pitch of 40 μm by spherical wave shift multiplexing, half-maximum width spot sizes of approximately 30 μm at a working distance of 4 cm may be formed at the pitch of 40 μm in the fast scanning direction, without crosstalk.

Example 5

In Example 5, an SLED array support is used, at which 100 SLEDs whose oscillation wavelength is 780 nm are arrayed one-dimensionally on the support with a pitch of 40 μm to serve as light-emitting elements, and a photopolymer layer with thickness 1 mm is formed at the light emission face side of the SLED array support, with a 2-mm air layer and a 0.7-mm transparent resin layer interposed therebetween. Laser light (spherical waves) that converges from the front face of the photopolymer layer toward the VCSELs with an NA of 0.6 is used as reference light. The image-forming plane is specified to be 2 cm distant from the point of intersection of the optical axis of the reference light with the front face of the photopolymer layer. Laser light that spreads from a point in this image-forming plane toward the photopolymer layer was used as signal light. The wavelengths of the signal light and the reference light are 780 nm. The optical axis of the reference light and the optical axis of the signal light intersect at an angle of 45°.

Figure 13:
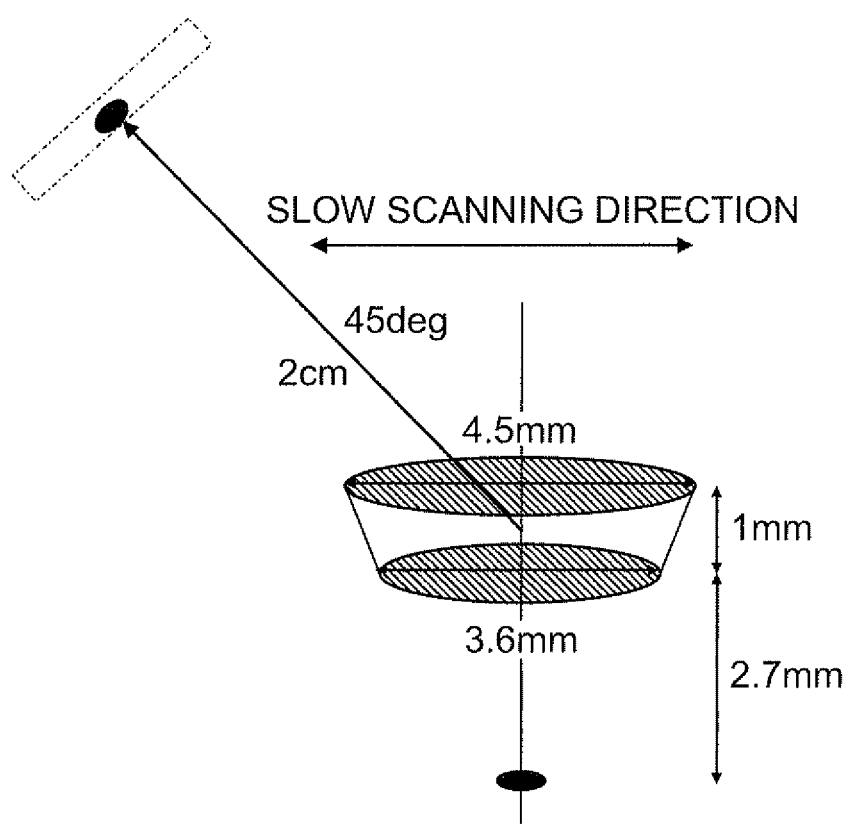
FIG. 13 is a schematic diagram illustrating a state in which diffracted light is reproduced from a volume hologram formed in Example 5.

The photopolymer layer is illuminated simultaneously with the signal light and the reference light from the front face side, while the laser array support is moved in the SLED arrangement direction at a pitch of 40 μm. At each of the 100 SLEDs, the signal light and the reference light are interfered in the photopolymer layer, and volume holograms with a hologram diameter $r_H$ of 4.5 mm and a hologram thickness $h_H$ of 1 mm are formed, as illustrated in FIG. 13. Similarly to Example 4, the 100 volume holograms are multiplexingly recorded at the pitch of 40 μm by spherical wave shift multiplexing.

Figure 14:
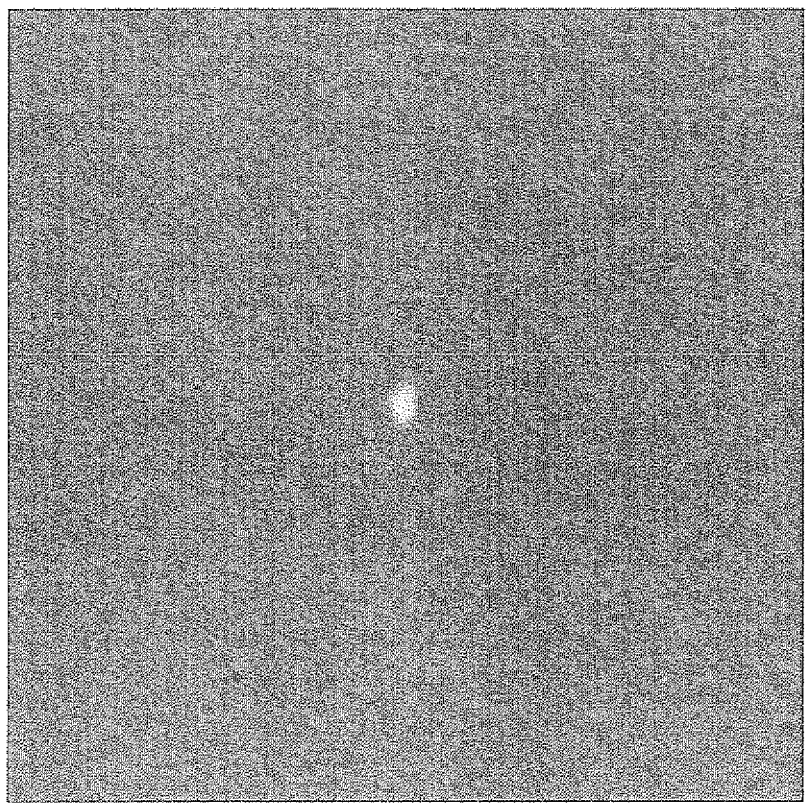
FIG. 14 is a captured image showing the spot form of a 50th spot.

Then, the 100 SLEDs are successively caused to emit light, and the emitted lights are illuminated as reproduction lights at the above-mentioned volume holograms. It is consequently verified, by image capture with an image sensor disposed in the image-forming plane, that 100 microscopic spots are formed 2 cm distant in a direction forming an angle of 45° with the optical axis of the emitted light, without crosstalk. The 100 microscopic spots are formed with a pitch of 40 μm in the fast scanning direction. FIG. 14 is a captured image showing the spot form of a 50th spot. From the captured image shown in FIG. 14, it is seen that a microscopic spot with a sharp outline is obtained.

From the above-described results, it is seen that when incoherent reproduction lights are illuminated from SLEDs at each of plural volume holograms with a hologram diameter $r_H$ of 4.5 mm and a hologram thickness $h_H$ of 1 mm, which have been multiplexingly recorded at a pitch of 40 μm by spherical wave shift multiplexing, microscopic spots at a working distance of 2 cm may be formed at the pitch of 40 μm in the fast scanning direction, without crosstalk.

What is claimed is:

1. An exposure device comprising:
   a light-emitting element array that is provided with an elongated support and a plurality of light-emitting elements formed on the support, the plurality of light-emitting elements being arranged in at least one row along a length direction of the support such that a spacing along the support length direction between the centers of adjacent light-emitting elements is a pre-specified first spacing; and
   a hologram element array that is provided with a hologram recording layer disposed on the support without an optical element in between the light-emitting element array and the hologram recording layer disposed on the support, and a plurality of hologram elements formed in the hologram recording layer, the plurality of hologram elements corresponding with each of the plurality of light-emitting elements and being formed such that a spacing along the support length direction between two adjacent hologram elements is the first spacing, and a diameter in the support length direction of each of the plurality of hologram elements being larger than the first spacing, such that a respective light emitted from each of the plurality of light-emitting elements is diffracted and focused toward a pre-specified image-forming plane by the corresponding hologram element.

2. The exposure device according to claim 1, wherein each of the plurality of hologram elements has a diameter in the range from 1 mm to 10 mm.

3. The exposure device according to claim 1, wherein each of the plurality of hologram elements comprises a volume hologram in which an intensity distribution of an interference pattern is recorded in surface directions and a thickness direction of the hologram recording layer.

4. The exposure device according to claim 1, wherein each of the plurality of hologram elements is multiplexingly recorded by at least one multiplexing recording system selected from the group consisting of shift multiplexing recording, angle multiplexing recording, wavelength multiplexing recording and phase multiplexing recording.

5. The exposure device according to claim 1, wherein each of the plurality of hologram elements is formed by causing reference light and signal light to interfere in the hologram recording layer, the reference light being spherical waves and having a position of the corresponding light-emitting element as a focusing position, and the signal light being condensed and focused at the image-forming plane.

6. The exposure device according to claim 1, wherein each of the plurality of light-emitting elements comprises at least one type selected from the group consisting of semiconductor lasers, light-emitting diodes and electroluminescent elements.

7. An image forming apparatus comprising:
   an exposure device according to claim 1;
   a photosensitive image recording medium at which an image is recorded by imagewise exposure by the exposure device;
   a movement section that relatively moves the image recording medium with respect to the exposure device; and
   a control section that, on the basis of image data, controls the movement section such that the image recording medium is slow-scanned in a direction orthogonal to the support length direction and controls lighting of each of the plurality of light-emitting elements.

8. The image forming apparatus according to claim 7, wherein each of the plurality of hologram elements has a diameter in the range from 1 mm to 10 mm.

9. The image forming apparatus according to claim 7, wherein each of the plurality of hologram elements comprises a volume hologram in which an intensity distribution of an interference pattern is recorded in surface directions and a thickness direction of the hologram recording layer.

10. The image forming apparatus according to claim 7, wherein each of the plurality of hologram elements is multiplexingly recorded by at least one multiplexing recording system selected from the group consisting of shift multiplexing recording, angle multiplexing recording, wavelength multiplexing recording and phase multiplexing recording.

11. The image forming apparatus according to claim 7, wherein each of the plurality of hologram elements is formed by causing reference light and signal light to interfere in the hologram recording layer, the reference light being spherical waves and having a position of the corresponding light-emitting element as a focusing position, and the signal light being condensed and focused at the image-forming plane.

12. The image forming apparatus according to claim 7, wherein each of the plurality of light-emitting elements comprises at least one type selected from the group consisting of semiconductor lasers, light-emitting diodes and electroluminescent elements.

* * * * *